US008634866B2

(12) United States Patent
Becker

(10) Patent No.: US 8,634,866 B2
(45) Date of Patent: Jan. 21, 2014

(54) FOLDED MONOPOLE VARIABLE SIGNAL COUPLER

(75) Inventor: Charles D. Becker, Helotes, TX (US)

(73) Assignee: Wireless Expressways Inc., San Antonio, TX (US)

( * ) Notice: Subject to any disclaimer, the term of this patent is extended or adjusted under 35 U.S.C. 154(b) by 241 days.

(21) Appl. No.: 13/155,768

(22) Filed: Jun. 8, 2011

(65) Prior Publication Data

US 2011/0298558 A1 Dec. 8, 2011

Related U.S. Application Data

(60) Provisional application No. 61/352,703, filed on Jun. 8, 2010.

(51) Int. Cl.
*H04B 7/00* (2006.01)
*H04B 7/005* (2006.01)

(52) U.S. Cl.
USPC ............. 455/523; 455/328; 455/81; 455/3.01

(58) Field of Classification Search
USPC ......... 455/3.01, 523, 67.11, 81, 328, 80, 289, 455/319, 323, 325; 333/27, 329, 248, 245
See application file for complete search history.

(56) References Cited

U.S. PATENT DOCUMENTS

| | | | | |
|---|---|---|---|---|
| 7,079,081 | B2 * | 7/2006 | Parsche et al. | 343/767 |
| 7,606,592 | B2 * | 10/2009 | Becker | 455/523 |
| 8,078,215 | B2 * | 12/2011 | Becker | 455/523 |
| 2007/0063914 | A1 | 3/2007 | Becker | |
| 2010/0117757 | A1 | 5/2010 | Yano | |

FOREIGN PATENT DOCUMENTS

| | | |
|---|---|---|
| JP | 56 008901 | 1/1981 |
| JP | 2007 088797 | 4/2007 |
| WO | WO 84/03394 | 8/1984 |
| WO | WO 2007/035523 | 3/2007 |

* cited by examiner

*Primary Examiner* — John J Lee
(74) *Attorney, Agent, or Firm* — Morgan, Lewis & Bockius LLP

(57) ABSTRACT

A signal coupler for coupling wireless signals out of and into a waveguide system is described. The signal coupler includes an input output connector, an outer conductor coupled to the input output connector, and a radiator section, wherein the radiator section is configured to rotate about a center axis of the outer conductor. A wireless distribution system, including a waveguide with a hollow cross-sectional structure and a signal coupling device, is also described. A wireless distribution system, including a waveguide with a hollow cross-sectional structure and a plurality of signal coupling devices, is also described. A method of operating a wireless distribution system is also described. The method includes providing a wireless distribution system and inserting a first group of wireless signals in a preselected bandwidth into the waveguide.

20 Claims, 6 Drawing Sheets

FOLDED MONOPOLE VARIABLE SIGNAL COUPLER

CROSS-REFERENCE TO RELATED PATENT APPLICATIONS

This patent application claims the benefit of U.S. Provisional Application No. 61/352,703 filed on Jun. 8, 2010, which is incorporated herein by reference.

This patent application is also related to U.S. Provisional Patent Application No. 60/718,419, entitled "Waveguide Wireless Distribution System," and filed Sep. 19, 2005, U.S. Pat. No. 7,606,592 granted on Oct. 20, 2009, and Continuation application Ser. No. 12/555,595, entitled "Waveguide Wireless Distribution System," and filed on Sep. 9, 2009, each of which is hereby incorporated by reference in their entirety.

FIELD

The present disclosure relates to wireless (radio) distribution systems, and more particularly to coupling devices that efficiently couple variable amounts of radio frequency energy from, or to, a hollow waveguide for wireless distribution, or for other purposes.

DESCRIPTION OF THE RELATED ART

This background information is provided in the context of a specific problem to which the disclosed subject matter in one or more of its aspects is applicable: the efficient variable coupling of radio frequency energy from, or to, a hollow metallic waveguide or metallic cavity.

The rapidly increasing use of both portable and fixed wireless-based communications devices requires more efficient and precise radio signal illumination of specific areas inside and outside building structures to fully utilize the government-limited radio frequency spectrum allocations and channels that are presently available.

The deployment of increasingly higher speed data, voice, and video information encoded in digital and analog wireless signals is increasing demands on the design of antenna systems in buildings and other facilities where obstructions, distances, or government regulations may limit the range of radio transmissions. This is particularly the case where government regulations and industry standards limit transmit power to low levels. There is also a concurrent need to limit transmit power from portable personal wireless devices to decrease drain on portable power sources, such as batteries, and also to reduce interference to nearby systems operating on the same channel. An efficient and variable coupling system from a waveguide-based wireless distribution system is highly desirable to solve these problems.

It is becoming increasingly difficult to provide reliable communications to users of higher-speed wireless data, voice and video services when centralized antennas in a facility are employed due to amplitude attenuation and reflection delays suffered by wireless signals passing through walls, partitions, floors, stair wells, and other structures and objects typically found in buildings prior to reaching client receivers.

There is a continuing and increasing challenge to cover all required areas in a facility with sufficient and predictable signal strength and quality that will provide reliable communications in an environment of government regulations that limit the maximum output power of wireless transmitters. In particular, increasingly higher data rates in digital wireless systems, with their attendant higher levels of encoding, are demanding higher signal-to-noise ratios and higher signal quality to support full-speed, reliable operation. One of the most efficient methods of distributing wireless signals to users know to date is to employ hollow metallic waveguide transmission media. Variable output ports on a hollow metallic waveguide system are needed to sufficiently and accurately apportion specific radiated levels (and thereby received) levels in areas of a user's facility.

IEEE 802.11a/b/g/n communications networks, for example, need antenna systems that will provide full, high-speed coverage to all users.

Other types of wireless systems that operate in the 1.5 GHz and higher frequency ranges, such as Bluetooth, ZigBee, and RFID systems will also benefit from more efficient signal distribution systems. The standards for these technologies specify simpler encoding formats, lower data rates, and lower transmit power, to miniaturize components, reduce cost per function, and reduce overall device drain from portable power sources, such as batteries. Several of these factors combine to presently limit the communications range or economical deployment of these types of systems. Although limited range is desirable in some instances, many wireless systems suffer from limited coverage and/or the ability to cover desired areas with defined signal strength and quality.

Many modern office buildings and schools use the volume of space above ceilings as a Heating Ventilating and Air Conditioning (HVAC) return air plenum for circulating air from human-occupied areas. Most government-mandated federal and local fire codes impose stringent requirements on the composition of items installed in plenum spaces to prevent the generation of noxious fumes that will recycle through an HVAC system into human-occupied areas during the occurrence of a fire in a plenum air space. As a result, coaxial cables and any other types of signaling components designed for service in plenum spaces often use a relatively high volume of special insulating materials in their construction, such as DuPont polytetrafluoroethylene ("Teflon®"), to meet fire regulations, which causes radio frequency coaxial cables made from this type of material to be prohibitively expensive in many applications. Because of these restrictions, presently available technology does not offer practical, efficient, and low-cost hidden wireless distribution systems that are designed for applications in HVAC plenum spaces.

The new technology presented in the present disclosure addresses solutions to resolve these and other shortcomings of the present technology in the field relating to the requirement for efficient, cost-effective, variable coupling devices used in conjunction with hollow waveguide wireless systems and other applications where an inexpensive and simplified means is needed to variably couple microwave signals from a hollow metallic waveguide or cavity.

SUMMARY

The techniques and concepts here disclosed provide variable wireless (radio) couplers for use in hollow metallic waveguide-based applications using wireless distribution systems for disseminating and gathering wireless signals in buildings, such as offices, factories, warehouses, schools, homes, and government facilities, and in open venues such as sports stadiums, parks, motorways, and railways, and for application in any instance where variable coupling or energy to or from a hollow metallic waveguide or cavity is required.

An additional application of the present disclosure addresses the need for an efficient and inexpensive variable microwave signal divider using the disclosed invention. Although fixed divider devices are available for dividing a microwave signal in integer fashion, e.g. 2,3,4, etc., they are excessively expensive for many applications where signals of a wide and variable ratio are needed, for example, to construct a wireless distribution system with multiple, different zones fed from a common transceiver.

In one instance the disclosed folded monopole variable signal couplers couple signals from a hollow metallic waveguide system and connect them to antennas at locations proximate to signal receivers. Intermediate devices between the referenced coupler and antennas, such as coaxial cables or additional hollow metallic waveguides may also be incorporated.

These and other advantages of the disclosed subject matter, as well as additional novel features, will be apparent from the description provided herein. The intent of this summary is not to be a comprehensive description of the claimed subject matter, but rather to provide a limited overview of some of the subject matter's functionality. Other systems, methods, features and advantages here provided will become apparent to one skilled in the art upon examination of the following FIGUREs and detailed description. It is intended that all such additional systems, methods, features and advantages as may be included within this description be considered within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify various elements correspondingly appearing throughout this description and wherein.

Figure 5:
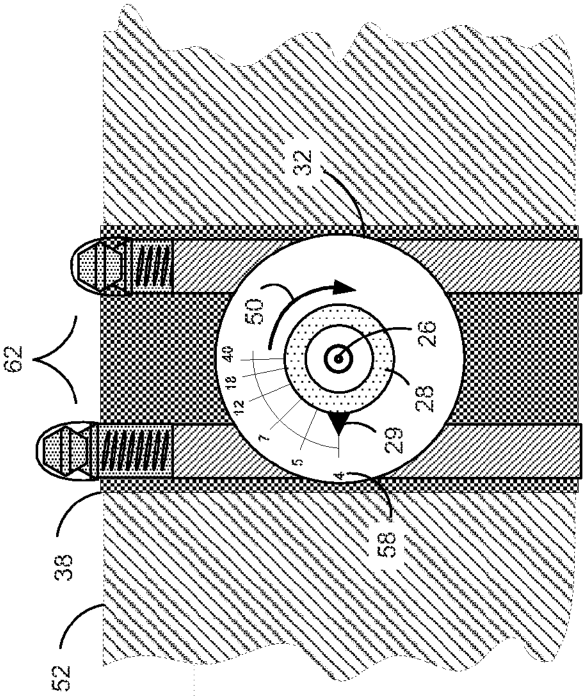
Figure 6:
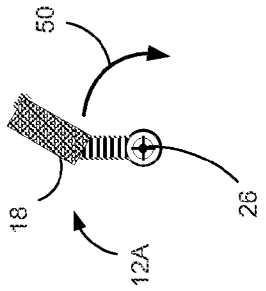
Figure 7:
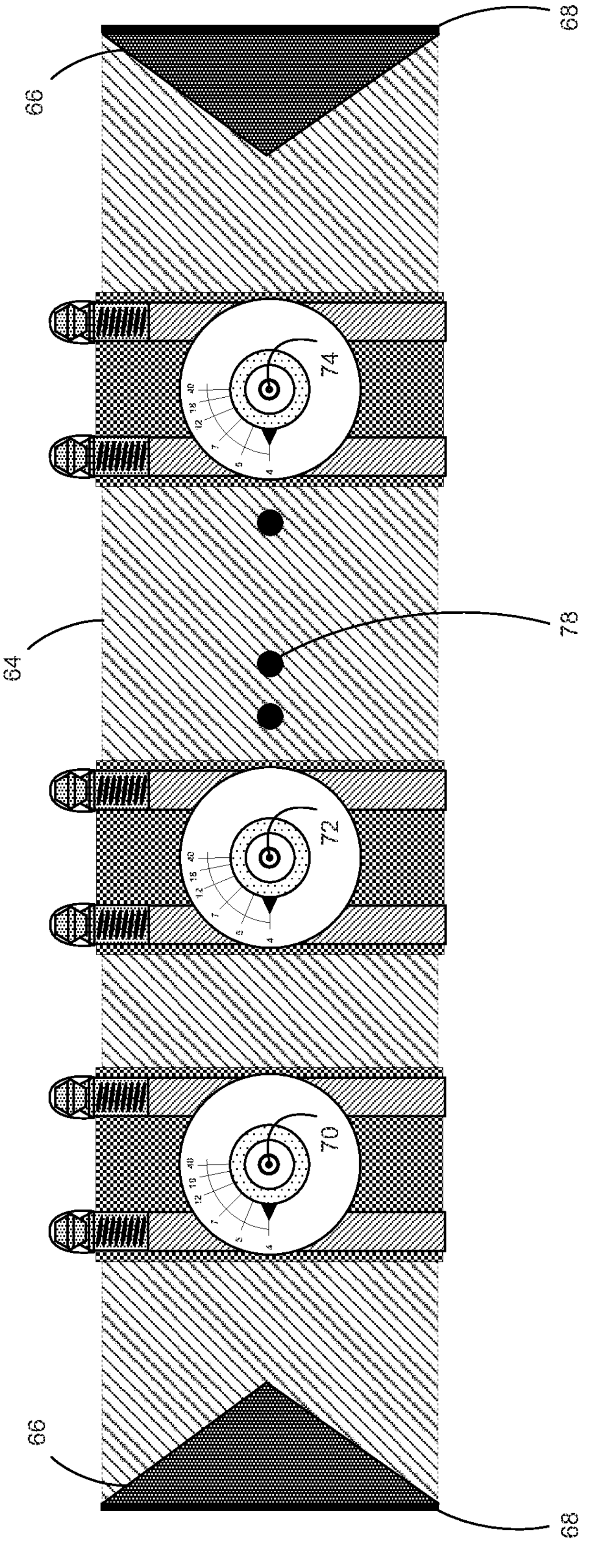
Figure 8:
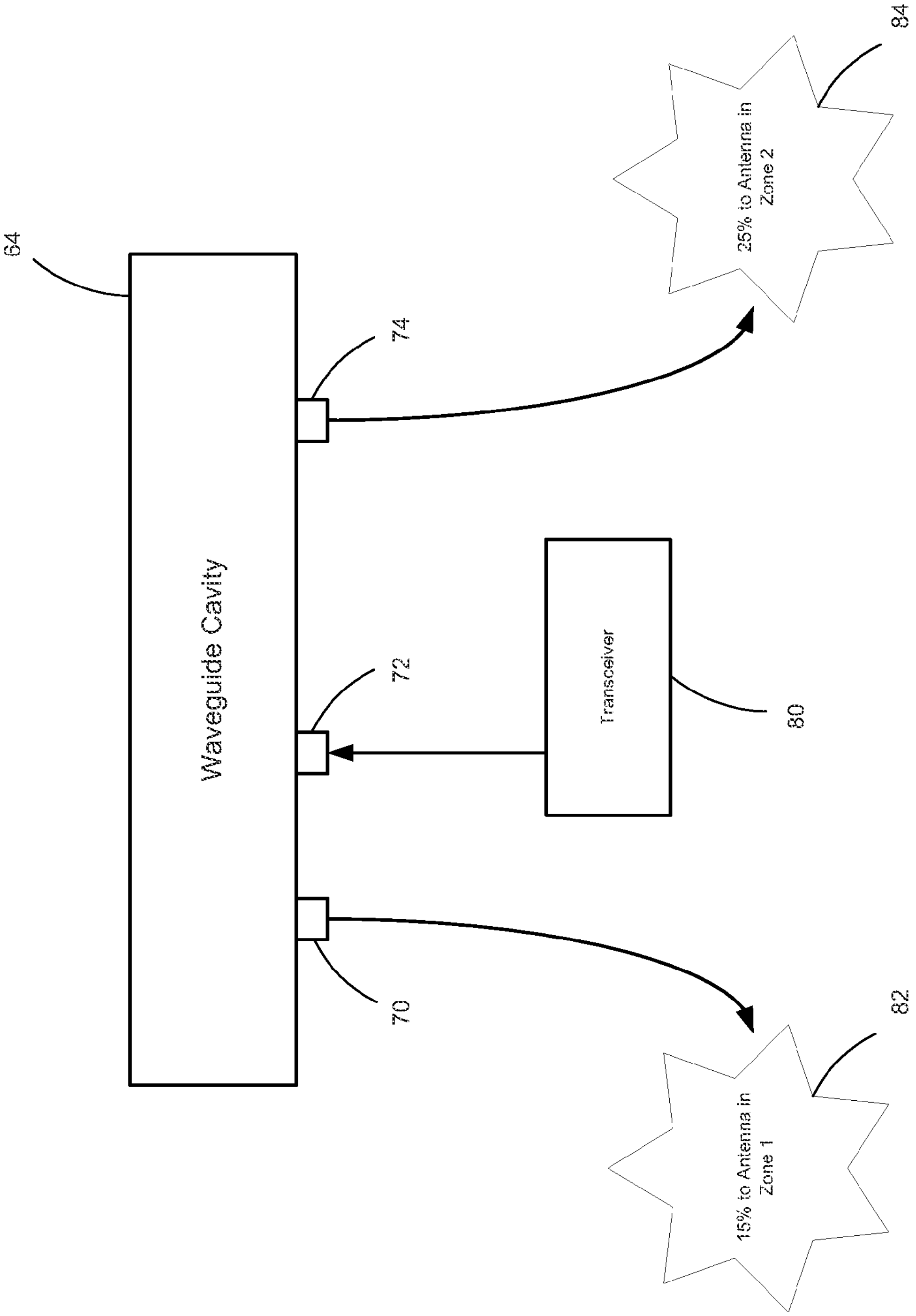
Figure 9:
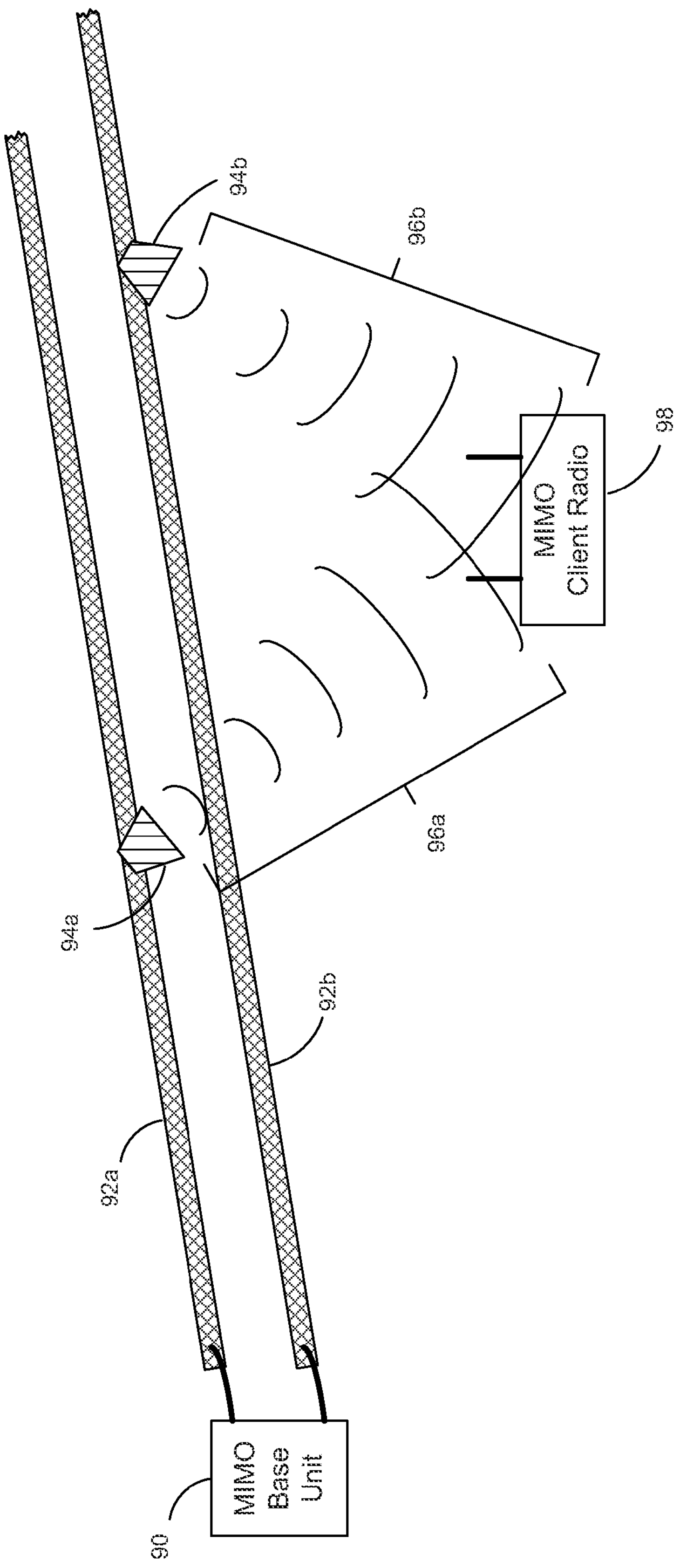

FIG. 5 illustrates an orthogonal view of the axis of an example hollow metallic elliptical waveguide showing the external side of the coaxial connector of the folded monopole variable signal coupler, an example dial indicator of the coupler's relative output coupling factor in decibels versus rotation, an example freedom of rotation, and an example method of attaching the folded monopole variable signal coupler to the example hollow metallic elliptical waveguide;

FIG. 6 illustrates an example method of changing the shape and limits of the output versus rotation of the radiator section of the folded monopole variable signal coupler around its common central axis;

FIG. 7 illustrates an external view of several folded monopole variable signal couplers mounted in a section of hollow metallic waveguide showing an example multi-port variable signal divider of a common input source signal;

FIG. 8 shows an example application of folded monopole variable signal couplers used in a waveguide cavity to variably divide signals from a single transceiver for use in two receiver zones in a facility; and FIG. 9 illustrates an exemplary use of signal couplers in a dual-waveguide wireless distribution system.

DETAILED DESCRIPTION OF SPECIFIC EMBODIMENTS

The disclosed subject matter includes various embodiments of a Folded Monopole Variable Signal Coupler shown in the above-listed drawings, where like reference numerals designate like parts and assemblies throughout the several views. Reference to various embodiments does not limit the scope of the claimed subject matter.

The terms "wireless" and "radio" are used synonymously throughout the Detailed Description to generally refer to any form of wireless, i.e., transmitted or received radio signal communication at any applicable frequency, unless a specific communication scheme and/or frequency is indicated (such as IEEE 802.11a,b,n Bluetooth, ZigBee, PCS, etc.).

Figure 1:
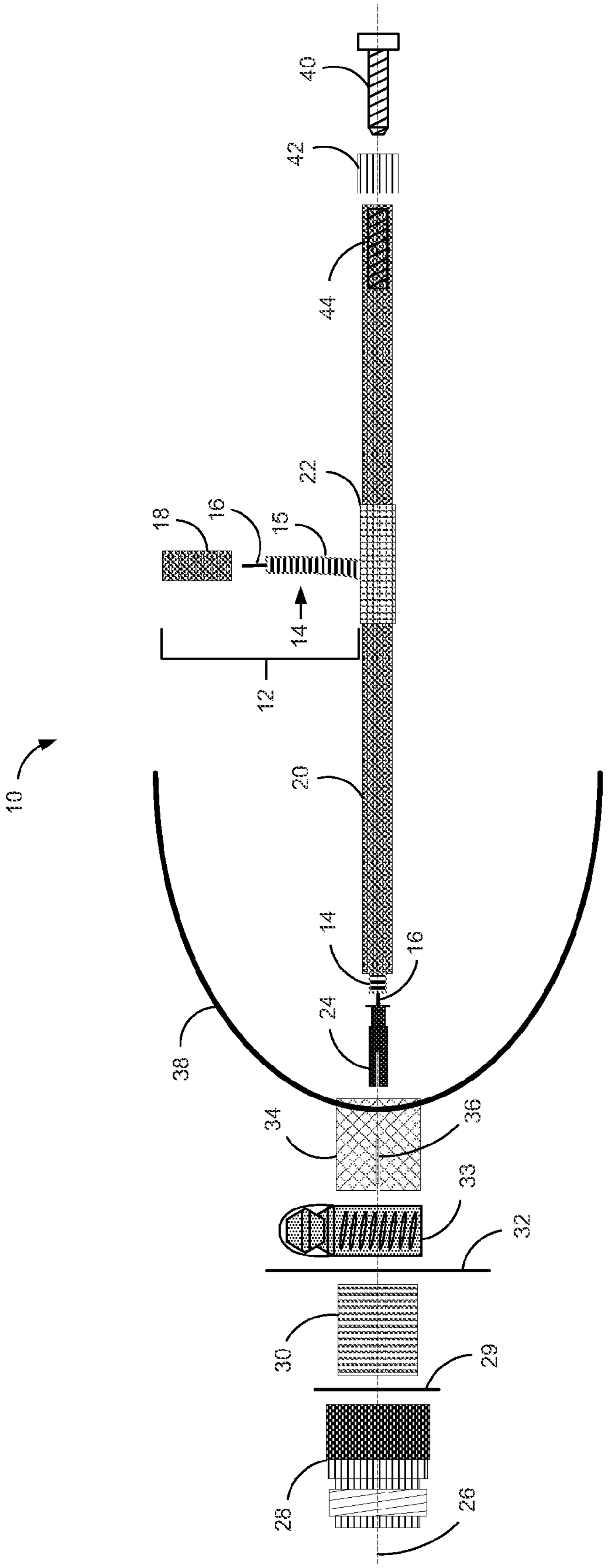
FIG. 1 illustrates an exploded side view of an embodiment of the folded monopole variable signal coupler in accordance with aspects of the present disclosure before installation in a hollow metallic elliptical waveguide.

FIG. 1 illustrates an exploded exemplary embodiment of a folded monopole variable signal coupler 10. Radiator section 12 is made up of insulated center conductor 14 and inductance section outer conductor 18. Insulated center conductor 14 includes insulation 15 and center conductor 16, and it starts at the top of inductance section outer conductor 18. Insulated center conductor 14 is electrically attached to the top of inductance section outer conductor 18 at soldered connection 19 (shown in FIG. 2), which forms a shorted inductive coaxial section of transmission line, and passes down through inductance section outer conductor 18, then bends and passes coaxially through hollow outer conductor 20 and presents its center conductor 16 for connection to coaxial connector center conductor 24. The location where center conductor 16 passes through support sleeve 22 may optionally incorporate a flexible joint to allow easier insertion into hollow elliptical waveguide 52 (shown in FIG. 2). In some embodiments, the portion of the insulated center conductor 14 between support sleeve 22 and inductance section outer conductor 18 does not include insulation 15. Support sleeve 22 may act as a mechanical support for the junction of insulated center conductor 14 where it enters outer conductor 20. In some embodiments, screw 40 mates with screw thread mating area 44 after passing through outer conductor 20 through exit hole 54 (shown in FIG. 2) and screw spacer 42. In other embodiments, the length of outer conductor 20 is shorter than the width of waveguide 52, so it does not pass through exit hole 54. Outer conductor 20 may extend, for example, approximately one quarter wavelength beyond the junction of insulated center conductor 14 and outer conductor 20.

Figure 3:
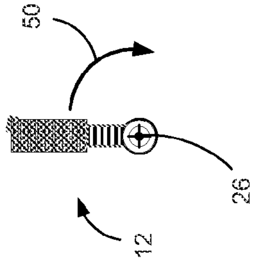
FIG. 3 illustrates an on-axis, end-view of the rotation-capable radiator assembly of an example folded monopole variable signal coupler residing internal to a hollow metallic elliptical waveguide.
Figure 2:
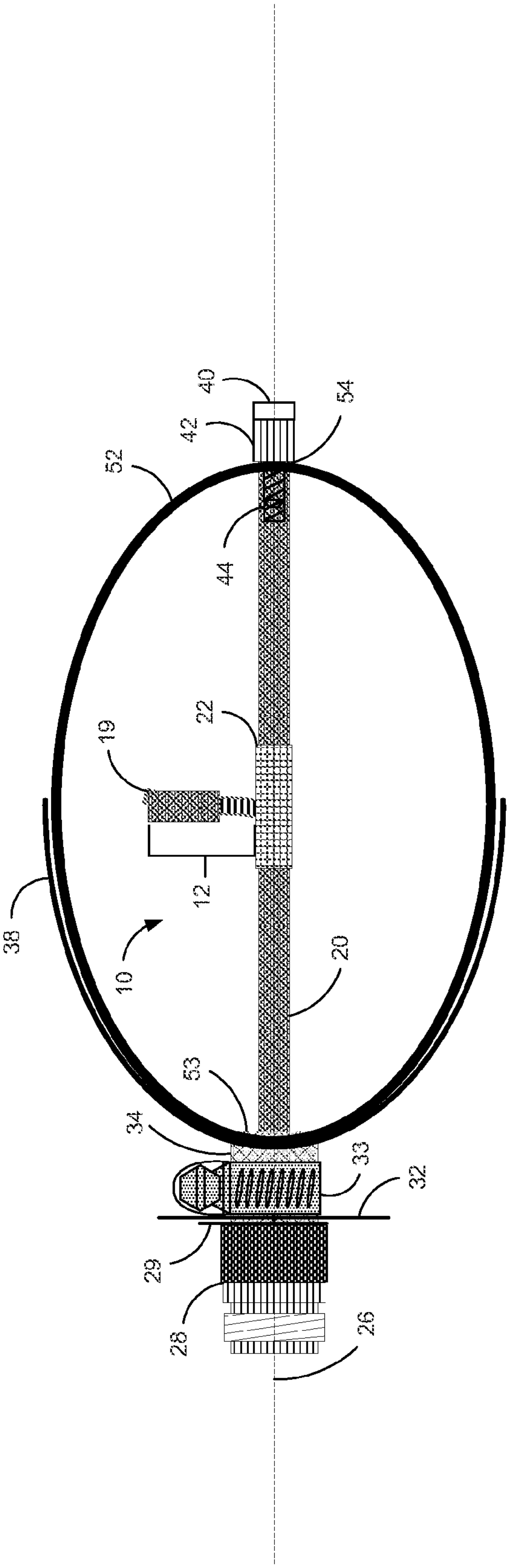
FIG. 2 illustrates the assembled folded monopole variable signal coupler shown mounted in an example cross-section of a hollow metallic elliptical waveguide.

The common center axis 26 is a common center line to all elements in FIG. 1, except the radiator section 12. With reference to FIG. 1 and FIG. 2, coaxial connector body 28 may act as a mechanical and electrical connection point for a mating external input connector ground for radiator section 12. Coaxial connector center conductor 24 inserts into coaxial connector body 28 and is followed by outer conductor 20 that secures to the ground shell of coaxial connector body 28. Scale pointer 29 is mechanically attached to coaxial connector body 28 and metallic spacer 30. Coupling indicator scale 32 is mechanically attached to slotted sleeve 34. Slotted sleeve 34 is attached to metal sheet mounting strap 38 which is secured to hollow elliptical waveguide 52. Securing clamp 33 is used to fix the rotated position of all components on common center axis 26 except securing clamp 33, slotted sleeve 34, and metal sheet mounting strap 38 after rotational adjustment is made. Sleeve slots 36 allow tightening of slotted sleeve 34 around metallic spacer 30. Both securing clamp 33 and screw 40 are tightened after the desired amount of signal coupling is accomplished by the rotation of radiator section 12 around common center axis 26 as shown by rotation arrow 50 in FIG. 3. As shown in FIG. 2, radiator section 12, in its illustrated position, will be maximally coupled to the electrical field of the fundamental transmission mode in hollow elliptical waveguide 52. This same condition of maximum coupling to the waveguide is shown in FIG. 5 by the position of scale pointer 29 in an example embodiment.

Other geometries of hollow waveguides, such as hollow rectangular or hollow circular metallic waveguide, or any linearly consistent hollow structure with a metallic inner surface of high electrical conductivity and sufficient skin depth in its inner surface that will support low loss at the desired frequency may also be employed with good results.

Figure 4:
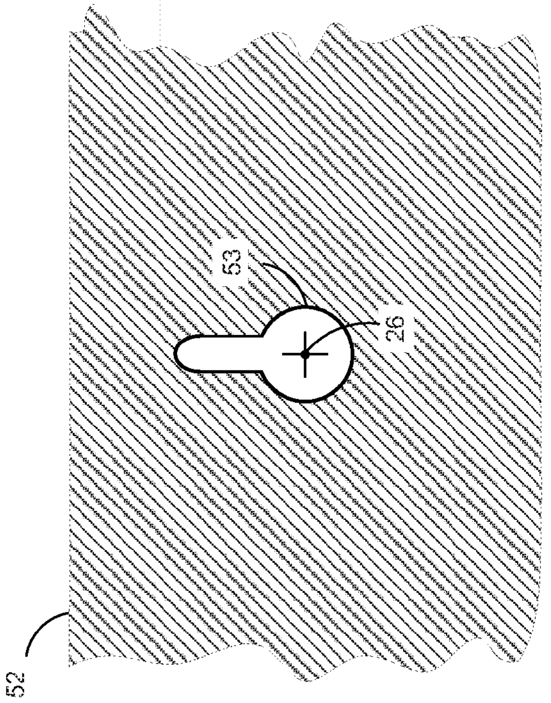
FIG. 4 illustrates a view of a typical opening that will mechanically accept the monopole variable signal coupler into the narrow side of an example hollow metallic elliptical waveguide and viewed orthogonally to the linear axis of the hollow metallic elliptical waveguide.

Entry hole 53 in FIGS. 2 and 4 is the entry point of the folded monopole variable signal coupler into hollow elliptical waveguide 52. The shape and position of entry hole 53 are chosen to allow entry of folded monopole variable signal coupler 10 into hollow elliptical waveguide 52 while causing low disruption of signal flow in the structure of hollow elliptical waveguide 52. After mounting in hollow elliptical waveguide 52, metal sheet mounting strap 38 and metallic spacer 30 cover entry hole 53 and fill entry hole 53 to minimize undesired disruption of the electromagnetic fields in hollow elliptical waveguide 52. Metal sheet mounting strap 38 is shown secured to hollow elliptical waveguide 52 with example securing clamps 62. Outer conductor 20 exits hollow elliptical waveguide 52 at exit hole 54.

FIG. 5 shows the complete folded monopole variable signal coupler 10 mounted in the narrow side of example hollow elliptic waveguide 52. By first releasing securing clamp 33 and screw 40, shown in FIG. 2, coaxial connector body 28 may be rotated around common center axis 26 to vary the amount of coupling of signals from hollow elliptical waveguide 52 provided by radiator section 12. The amount of coupling can be calibrated and graduated on numbered dial 58 for later reference to the position of scale pointer 29. The example scale of numbered dial 58 shown in FIG. 5 is calibrated in decibels of coupling loss.

The initial and final amounts of coupling of energy from hollow elliptical waveguide 52 caused by the rotation of radiator section 12 through a 90 degree displacement arc around common center axis 26 may be changed by selecting the electrical parameters of the inductance section outer conductor 18, such as its length, inside diameter, outside diameter, distributed capacitance to the inner surface of hollow elliptical waveguide 52 and/or the impedance of the coaxial line formed in its interior, and/or the spacing of the bottom of inductance section outer conductor 18 from support sleeve 22, and/or the geometry of inductance section outer conductor 18, and/or the geometry of radiator section 12 relative to the electrical field in hollow elliptical waveguide 52 as radiator section 12 is rotated. All of these variables and resultant effects are known by those skilled in the art.

FIG. 6 shows one example of these possible variations that will change the overall coupling factor of radiator section 12 and its output response characteristics. Modified radiator section 12A is shown with inductance section outer conductor 18 set at an off-axis angle that will decrease maximum coupling of modified radiator section 12A due to a lower maximum intercept of the electric field in waveguide 52 and also decrease minimum coupling due to the inability of producing an ideal null by not being able to be positioned orthogonally to the electric field. This change may be desirable in certain applications in the field. Any variation of the aforementioned parameters to change the coupling characteristics would be made with a concurrent goal of also preserving a desired voltage standing wave ratio exhibited by the folded monopole variable signal coupler 10 as presented to an external connection at coaxial connector body 28.

FIG. 7 shows three or more folded monopole variable signal couplers 10 installed in waveguide cavity 64, which may be any hollow metallic waveguide that supports the transmission of electromagnetic signals. Resistive terminations 66 are employed in the ends of waveguide cavity 64 to absorb excessive energy injected into waveguide cavity 64 and to minimize reflections in waveguide cavity 64. These terminations could, for example, be standard RF absorbing material placed at the ends of the cavity, or could be electric or magnetic probes inside waveguide cavity 64 with resistive terminations. If probes, they can be placed at approximately one quarter wavelength from reflecting end 68 to capture essentially all of the energy propagating in the direction of a reflecting end 68 if a resistive termination 66 is not used, and should be, for example, approximately one quarter electrical wavelength long. First, Second, and Third coupler input/output ports 70, 72 and 74, respectively, on their separate folded monopole variable signal couplers are used to variably inject or retrieve signals from waveguide cavity 64 and may be configured, for example, as depicted in FIG. 5. Any number of ports may be installed in waveguide cavity 64, depending on the requirements of a particular application as indicated by optional coupler positions 78. A typical application may be, for example, the controlled summation of the amplitude of signals among a plurality of radiators in a wireless distributed antenna system and the reciprocal division of a signal from a common transmitter to all receivers associated with separate folded monopole variable signal couplers installed in waveguide cavity 64.

FIG. 8 shows a simple illustration of a variable signal division wherein the output of a transceiver 80 is connected to second coupler input/output port 72 whose output is divided between an antenna receiver zone 1 antenna 82 by first coupler input/output port 70 and receiver zone 2 antenna 84 by third coupler input/output port 74. Residual losses in cables, connectors, couplers, and waveguide cavity 64 are ignored in this example.

FIG. 9 illustrates the use of signal couplers in a dual-waveguide wireless distribution system. One possible use of a dual-waveguide wireless distribution system is to easily implement multiple-input, multiple-output (MIMO) wireless communication. Examples of MIMO wireless communication implementations include WiMAX and IEEE standard 802.11n. Referring to FIG. 9, MIMO base unit 90 is connected to waveguides 92. The waveguides include signal couplers 94 to transmit and receive wireless signals 96. Thereby allowing MIMO client radio 98 to be in wireless communication with MIMO base unit 90 via waveguides 92 and signal couplers 94.

A Folded Monopole Variable Signal Coupler and an example application have been presented. The foregoing description of the preferred embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A signal coupler for coupling wireless signals out of and into a waveguide, comprising:

an input output connector;

an outer conductor coupled to the input output connector;

a radiator section, including an inductance section outer conductor, the radiator section coupled outward from a center axis of the outer conductor; and an insulated center conductor electrically coupled to the inductance section outer conductor of the radiator section at a first end and passed coaxially through the inductance section outer conductor and the outer conductor to connect to the input output connector at a second end, wherein the radiator section is configured to rotate about the outer conductor.

2. The signal coupler of claim 1, wherein the insulated center conductor electrically terminates at a top end of the inductance section outer conductor, wherein the top end is a portion of the inductance section outer conductor furthest from the outer conductor.

3. The signal coupler of claim 1, wherein the radiator section is coupled substantially perpendicular to the center axis of the outer conductor.

4. The signal coupler of claim 1, further comprising a coupling indicator scale to indicate the amount of decibels of coupling loss.

5. The signal coupler of claim 1, wherein the inductance section outer conductor is set at an off-axis angle to the axis normal to the center axis of the outer conductor.

6. A wireless distribution system comprising:

a waveguide with a hollow cross-sectional structure and a conductive inner surface that supports the transmission of wireless signal energy, the waveguide including an entry hole;

a signal coupling device coupled to the waveguide through the entry hole of the waveguide, the signal coupling device includes:

an input output connector;

an outer conductor coupled to the input output connector through the entry hole of the waveguide;

a radiator section, including an inductance section outer conductor, the radiator section coupled outward from a center axis of the outer conductor; and an insulated center conductor electrically coupled to the inductance section outer conductor of the radiator section at a first end and passed coaxially through the inductance section outer conductor and the outer conductor to connect to the input output connector at a second end, wherein the radiator section is configured to rotate about the outer conductor.

7. The wireless distribution system of claim 6 wherein the shape of the hollow waveguide is round, elliptical, rectangular, or any linear hollow shape of consistent cross section.

8. The wireless distribution system of claim 6 wherein the cross-sectional structure of the hollow waveguide is longitudinally consistent, and the inner surface of the waveguide is electrically conductive.

9. The wireless distribution system of claim 6 further comprising a metal sheet mounting strap coupled to a metallic spacer configured to electrically and mechanically cover the entry hole of the waveguide.

10. The wireless distribution system of claim 6, further comprising:

an exit hole in the waveguide opposite the entry hole, wherein the outer conductor passes through the exit hole of the waveguide;

a spacer coupled to an end of the outer conductor outside of the second hole of the waveguide; and a fastener connecting the outer conductor to the second hole of the waveguide.

11. A wireless distribution system comprising:

a waveguide with a hollow cross-sectional structure and a conductive inner surface that supports the transmission of wireless signal energy, the waveguide including a plurality of signal ports to inject and extract wireless signal energy; and a plurality of signal coupling devices coupled through the plurality signal ports, each of the plurality of signal coupling devices includes:

an input output connector;

an outer conductor coupled to the input output connector through one of the plurality of signal ports;

a radiator section, including an inductance section outer conductor, the radiator section coupled outward from a center axis of the outer conductor; and an insulated center conductor electrically coupled to the inductance section outer conductor of the radiator section at a first end and passed coaxially through the inductance section outer conductor and the outer conductor to connect to the input output connector at a second end, wherein the radiator section is configured to rotate about the outer conductor.

12. The wireless distribution system of claim 11 further comprising an additional waveguide with a hollow cross-sectional structure and a conductive inner surface that supports the transmission of wireless signal energy.

13. The wireless distribution system of claim 12 wherein at least one of the plurality of signal couplers is spaced at a different linear location along the waveguide than a signal coupler coupled to the additional waveguide.

14. The wireless distribution system of claim 12 wherein the waveguide and the additional waveguide are both configured to transport a group of frequencies in the same bandwidth, and the group of frequencies in the waveguide is uncorrelated with the group of frequencies in the additional waveguide in at least instantaneous amplitude, frequency, or phase.

15. A method of operating a wireless distribution system comprising: providing the wireless distribution system that includes:

a waveguide with a hollow cross-sectional structure and a conductive inner surface that supports the transmission of wireless signal energy, the waveguide including a plurality of signal ports to inject and extract wireless signal energy, and a plurality of signal coupling devices coupled through the plurality of signal ports, each of the plurality of signal coupling devices includes:

an input output connector, an outer conductor coupled to the input output connector through one of the plurality of signal ports, a radiator section, including an inductance section outer conductor, the radiator section coupled outward from a center axis of the outer conductor, and an insulated center conductor electrically coupled to the inductance section outer conductor of the radiator section at a first end and passed coaxially through the inductance section outer conductor and the outer conductor to connect to the input output connector at a second end, wherein the radiator section is configured to rotate about the outer conductor; and inserting a first group of wireless signals in a preselected bandwidth into the waveguide.

16. The method of operating a wireless distribution system of claim 15 further comprising inserting a second group of wireless signals into the waveguide, where the first and second groups of wireless signals occupy different frequencies.

17. The method of operating a wireless distribution system of claim 15 further comprising inserting a second group of wireless signals into the waveguide, where the frequencies of the first and second groups of wireless signals are in the same bandwidth and the first group of wireless signals is uncorrelated with at least the instantaneous amplitude, frequency or phase of the second group of wireless signals.

18. The method of operating a wireless distribution system of claim 15 further comprising:

receiving in a first receiver a first group of wireless output signals originating from one of the plurality of signal couplers;

receiving in a second receiver a second group of wireless output signals originating from a different one of the plurality of signal couplers that is different than the first group of wireless signals in at least instantaneous amplitude, frequency or phase; and deriving separate information from each of the first and second groups of wireless output signals that can be recombined for a total higher information delivery rate.

19. The method of operating a wireless distribution system of claim 18 wherein the first and second groups of wireless signals are each formatted for MIMO.

20. The method of operating a wireless distribution system of claim 15 further comprising:

providing an additional waveguide with a hollow cross-sectional structure and a conductive inner surface that supports the transmission of wireless signal energy, receiving in a first receiver a first group of wireless output signals radiating from the waveguide provided in the wireless distribution system;

receiving in a second receiver a second group of wireless output signals radiating from the additional waveguide that is different than the first group of wireless signals in at least instantaneous amplitude, frequency or phase; and deriving separate information from each of the first and second groups of wireless output signals.

* * * * *